Feb. 20, 1951 — H. EKSTEIN — 2,542,275
METHOD OF AND MEANS FOR TESTING ELECTROVIBRATORY BODIES
Filed Sept. 19, 1946 — 3 Sheets-Sheet 1

Inventor
HANS EKSTEIN
by The Firm of Charles W. Hills Attys.

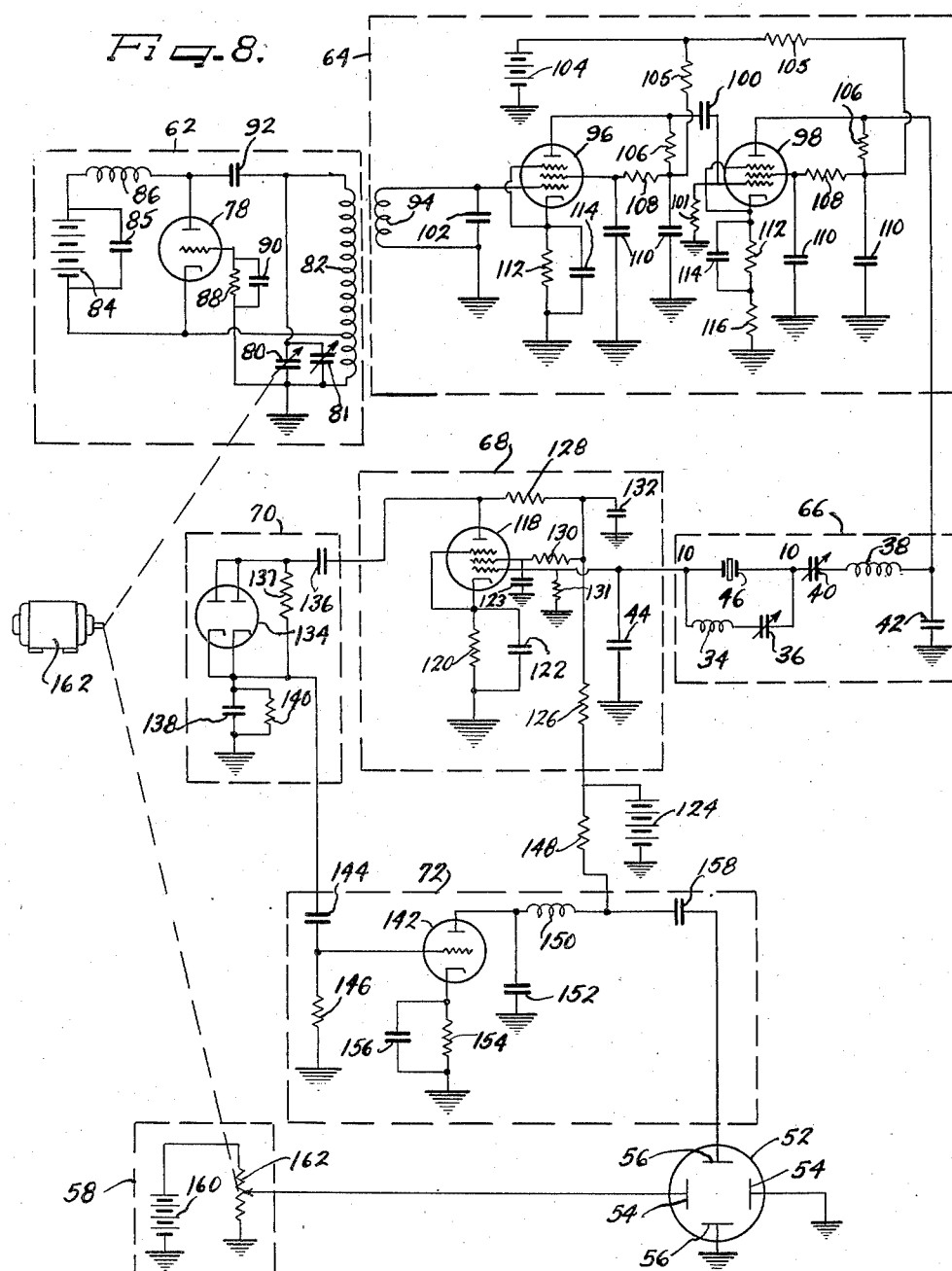

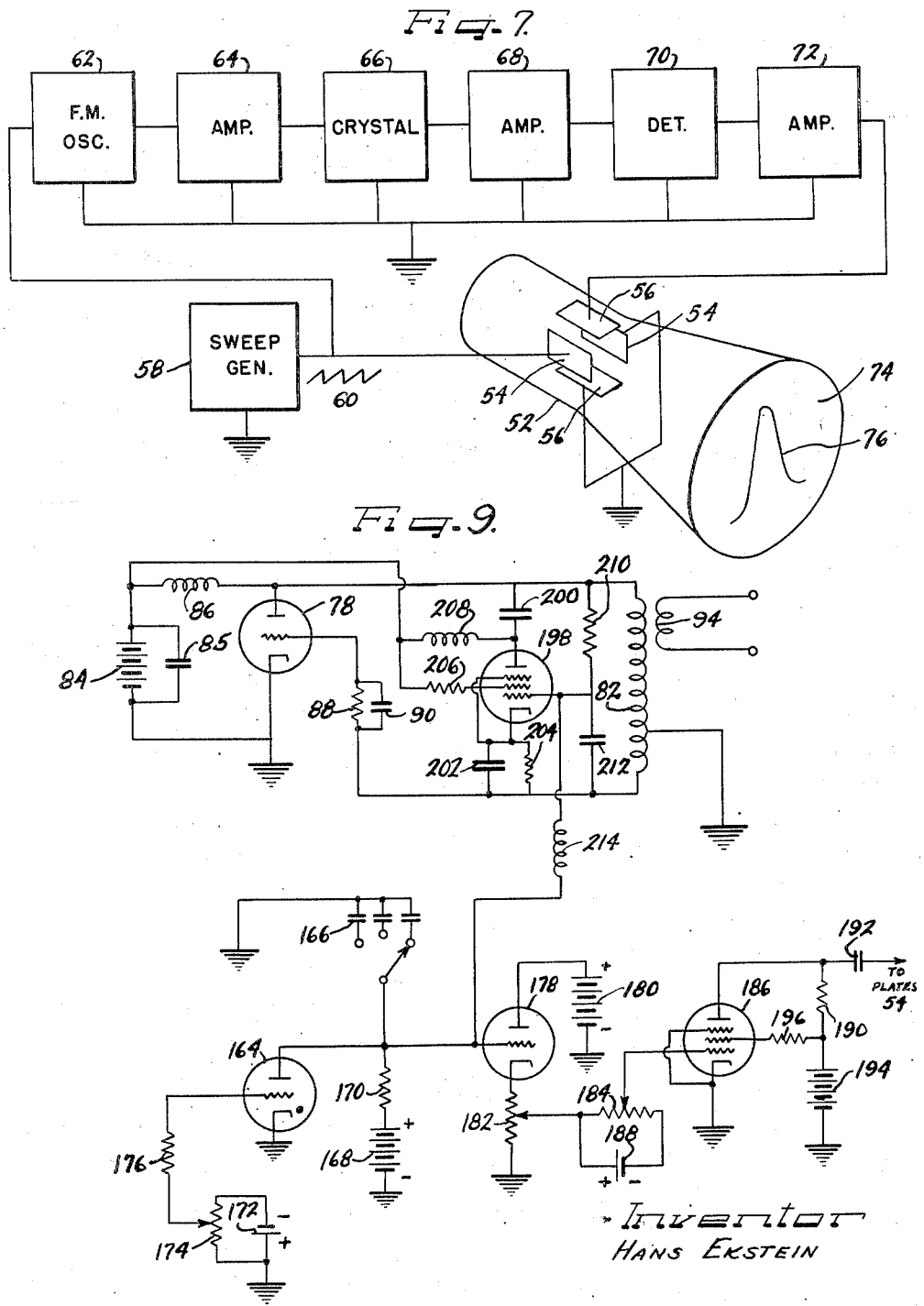

Patented Feb. 20, 1951

2,542,275

UNITED STATES PATENT OFFICE 2,542,275

METHOD OF AND MEANS FOR TESTING ELECTROVIBRATORY BODIES

Hans Ekstein, Chicago, Ill.

Application September 19, 1946, Serial No. 698,046

5 Claims. (Cl. 175—183)

My invention relates to methods of and means for testing electro-vibratory bodies and more particularly to the detection of activity dips in such bodies without varying the temperature thereof.

Electro-vibratory bodies, such as piezo-electric crystals, are widely used as frequency stabilizing and frequency selective elements by reason of the high degree of frequency stability of these devices when excited by alternating voltages of appropriate frequency. This is a consequence of the high "Q" or ratio of stored energy to energy dissipated per cycle in such devices. In normal operation however, these devices pass through a substantial range in operating temperature, starting at room temperature when first actuated and increasing in temperature with time until a final temperature value is reached. In the case of piezo-electric crystals, it has been found that by proper grinding relative to the axes of the quartz or other material from which they are ground this temperature variation can be caused to exert negligible influence on the crystal natural oscillating frequency. A typical crystal of this type, for example, consists of the so-called AT cut crystal. However, these bodies inherently have other modes of oscillation, designated herein "parasitic" modes, and which are coupled to the normal mode of oscillation so as to decrease the activity of the body and cause "activity dips" when too closely related to the natural oscillating frequency. It has thus far been impossible to control the variations in frequency of these modes with temperature so that while a particular body may not have a parasitic mode of oscillation or an activity "dip" at normal room temperature, it may have such a condition of operation at the elevated temperatures associated with continued operation. Conversely, a body having no activity "dip" at room temperature may experience such phenomena at depressed temperature and thus fail to commence oscillation when exposed to low temperatures such as those encountered in aircraft operating at high altitude.

It is an object of my invention to predict the presence of activity dips in electro-vibratory bodies at elevated or depressed temperatures while the body itself is maintained at room temperature.

It is a further object of my invention to predict the presence of activity dips in electro-vibratory bodies.

Yet another object of my invention is to provide means visually to display the performance of an electro-vibratory body at elevated or depressed temperatures although the body is actually operating at room temperature.

Further it is an object of my invention to provide means visually to display the performance of an electro-vibratory body at elevated or depressed temperatures although it is actually operating at room temperature and having features of construction, combination, and arrangement rendering it particularly suitable for routine production testing of piezo-electric crystals.

The novel features which I believe to be characteristic of my invention are set forth in particularity in the appended claims. My invention itself, however, both as to its organization and method of operation, together with further objects and advantages thereof, may best be understood by reference to the following description taken in connection with the accompanying drawings.

On the drawings:

Figure 7 shows in block form an apparatus constructed in accordance with my invention and capable of indicating visually the activity dips of electro-vibratory bodies;

Figure 8 shows the detailed circuit diagram of one embodiment of the apparatus of Figure 7; and Figure 9 shows an alternate circuit diagram of a portion of the apparatus of Figure 7.

As shown on the drawing:

Figure 1:
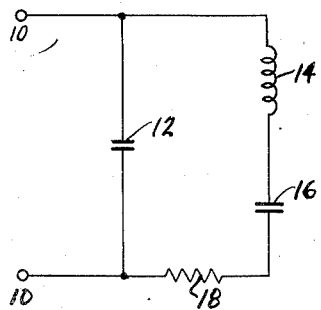
Figure 1 is the approximate equivalent circuit of an electro-vibratory body such as a piezo-electric crystal.

The conventional equivalent circuit of an electro-vibratory body such as a piezo-electric crystal is shown in Figure 1 where terminals 10 indicate the plates or terminals to which the crystal is connected and across which electrical quantities such as voltage are measured. This equivalent circuit consists of two branches, one consisting of shunt capacitance 12 and the other consisting of the RLC series circuit comprising inductor 14, capacitance 16, and resistance 18. The capacitance 12 corresponds to the electrostatic capacity between the crystal electrodes when the crystal is in place but not vibrating whereas the resistance, capacitance and inductance of the series RLC circuit represents the equivalent frictional loss of the vibrating crystal, the equivalent mass thereof, and the equivalent compliance thereof, respectively. It will be understood, of course, that the elements 14, 16, and 18, do not actually physically exist as conventional electric circuit elements but in fact only represent the electrical quantities or elements that produce voltages and current corresponding to those actually produced by the mechanical vibration of the crystal when subjected to voltage across terminal 10.

Figure 5:
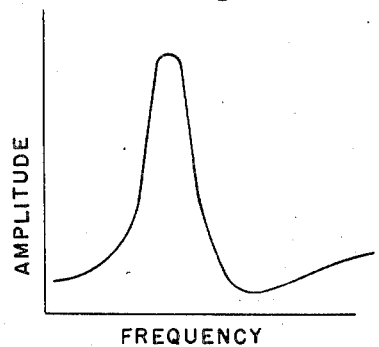
Figures 5 and 6 show the resonance curve of an electro-vibratory body such as a piezo-electric crystal for the case of normal operation and the case of an activity "dip," respectively.

In normal operation it is desirable that the crystal perform in accordance with the circuit of Figure 1. That is, over the range of resonant frequency wherein the inductive reactance of element 14 is substantially equal to the capacitive reaction of element 16 as modified by resistance 18 and capacitance 12, the unit should perform as an RLC circuit. It is well known that the resonance curve showing the amplitude of oscillation, or the voltage across terminal 10, as a function of frequency should consist of a sharply peaked curve such as that shown in Figure 5. This curve of operation indicates a high "Q" or large ratio of stored energy to energy dissipated per cycle with the incident high degree of frequency stability and selectivity.

Figure 2:
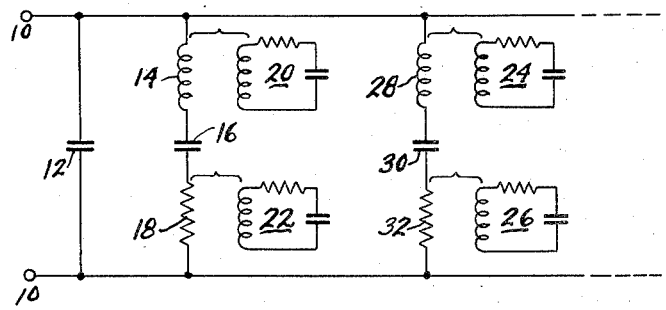
Figure 2 is a more exact equivalent circuit for an electro-vibratory body such as a piezo-electric crystal.

A more complete equivalent circuit diagram representative of a crystal is shown in Figure 2, this diagram taking into account the effect of "parasitic" modes of oscillation or vibration and the resultant activity dips. These modes of oscillation are inherent in the crystal structure and vibrations are induced therein when the crystal vibrates in the normal manner by reason of couplings due to the physical crystal structure. The crystal has a natural frequency of vibration for each of these modes analagous to the natural frequency represented by the desired mode of operation as indicated by elements 14, 16, and 18, Figure 1. Two of these modes are shown generally at 20 and 22, Figure 2. It will be observed that mode 20 is shown as coupled to inductance 14 whereas mode 22 is shown as coupled to the common connection of condenser 16 and resistance 18. Of course, this is merely a schematic method of indicating that these modes are excited by the excitation of the crystal in the main mode of oscillation represented by inductance 14, capacitance 16, and resistance 18. As shown in Figure 2, each of these modes may be represented by a series RLC circuit.

When the natural frequency of the crystal nearly coincides with the natural frequency of oscillation of circuit 20 or circuit 22, oscillations are built up in these circuits when voltage of this frequency is applied to the crystal. Inasmuch as these oscillations may be of very large magnitude by reason of the near coincidence between the resonant frequency and the actual frequency of excitation, large amplitude vibrations with corresponding large energy losses are created. This energy loss must be taken from the source of energy connected to terminal 10. Consequently the energy loss in the crystal for each cycle is increased, the ratio of stored energy to energy loss correspondingly decreased, and the suitability of the crystal as a source of stabilized oscillation or as a filter is reduced. In fact, the energy losses associated with the parasitic mode of oscillation in this case may be so great as to prevent achieving oscillations of any useful magnitude in the main mode, thus rendering the device utilizing the crystal completely inoperative.

The exact equivalent circuit of an electro-vibratory body such as a piezo-electric crystal includes, in addition to the parasitic circuits 20 and 22, Figure 2, other parasitic circuits, as for example 24 and 26 coupled to additional modes of oscillation of the crystal which may be represented by the RLC series circuit comprising inductance 28, capacitance 30 and resistance 32.

While the equivalent electrical elements shown in Figures 1 and 2 are shown as constant values, they are actually variable as the temperature of the crystal is altered. By proper crystal construction the effect of these variations on the principal mode of oscillation associated with inductance 14, capacitance 16, resistance 18, and capacitance 12 can be made very small, thereby providing a high degree of frequency stability over a temperature range. However, it has thus far been impossible to control the variations in the equivalent electrical circuits of the parasitic modes of operation such as 20 and 22. Consequently, as the temperature of operation of the crystal is varied these modes of oscillation exert a greater or lesser influence on crystal performance as their natural frequency varies relative to the main oscillations, thus causing the crystal activity to vary with temperature.

Figure 6:
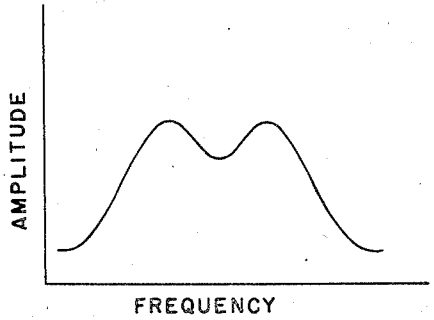

The operation of the crystal when the resonant frequency of a parasitic mode of oscillation nearly coincides with the natural resonant frequency of the main mode may be represented by the amplitude of oscillations or the current through the crystal as voltages over a range of frequencies are applied thereto. Such a curve is shown in Figure 6. As shown in this figure, the shape of the resonance curve corresponds to the well known double hump shaped curve associated with two over-coupled electrical circuits and is relatively broad and flat. Of course in the presence of a high loss parasitic mode a flat, single humped, curve similar to that associated with a low "Q" circuit would be obtained. It is obvious that this characteristic does not have the high degree of frequency selectivity associated with normal crystal operation as indicated by the resonance curve of Figure 5, and that the performance of the crystal as a frequency stabilizing element or filter is substantially impaired. It will, of course be obvious that as the coupling with a parasitic mode is increased and the natural frequency thereof corresponds more and more closely to the actual operating frequency, the curve of Figure 6 will become more and more broad and flat and will depart to an ever-increasing degree from the curve of Figure 5.

In accordance with one aspect of my invention the performance of a piezo-electric crystal or other electro-vibratory body when subjected to varying temperatures of operation is predicted by causing the crystal to operate at various natural frequencies close to the natural operating frequency while at room temperature. In this manner the relationship between the actual frequency of operation and the natural frequency of the parasitic modes is altered in a manner analogous to that associated with the normal temperature changes incident to operation. Thus, if an activity "dip" is found with the crystal operating at a frequency relatively close to its natural resonant frequency, it can be expected that the crystal will experience an activity dip when operating at the elevated temperature associated with continuous operation or at a low temperature incident to operation on high altitude aircraft. Conversely, if variations in the frequency of operation of the crystal over a reasonable range about its natural oscillating frequency produce no indications of parasitic modes, it can be concluded that no difficulties of this type will arise when the crystal temperature is varied in the manner incident to normal operation since if such modes exist their natural frequency cannot vary with temperature in an amount sufficient to bring them to substantial coincidence with the frequency of oscillations of the main mode.

Figure 4:
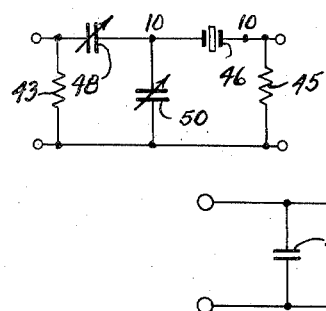
Figures 3 and 4 show circuits whereby the natural oscillating frequency of an electro-vibratory body may be altered.
Figure 3:
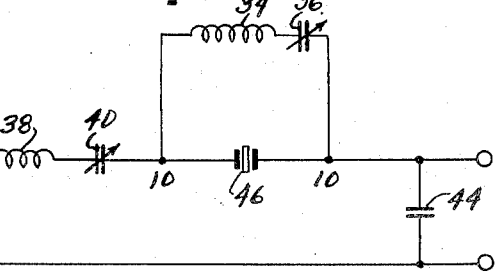

It is not normally possible to operate a piezoelectric crystal at frequencies greatly different from its natural resonant frequency by merely applying voltage of such other frequency thereto because of the sharply selective resonance curve of the crystal. That is, an excessive voltage of such other frequency must be applied to induce vibration in the plate because in this condition there is no efficient build-up of energy to achieve large amplitude oscillations. I have found, however, that operation at a frequency other than the natural frequency of the crystal may be obtained without application of excessive voltage by modifying the crystal frequency by external reactive circuit elements, thus providing an overall circuit having the desired natural frequency and hence efficient build-up of energy. Two circuits for accomplishing this result are shown in Figures 3 and 4. In each case, the reactive elements are connected across the crystal terminals so that they combine with the equivalent reactive elements shown in Figure 1 to provide an electromechanically resonant system having a natural resonant frequency slightly different from that due to the crystal itself. In the case of Figure 3, these elements consist of shunt inductance 34 and shunt capacitance 36, together with series inductance 38 and series capacitance 40 as well as capacitors 42 and 44. The crystal is shown at 46, Figure 3 and has terminals 10 corresponding to terminals 10, Figures 1 and 2. Similarly, in Figure 4, crystal 46 is provided with series capacitor 48 and shunt capacitor 50 connected so as to vary the natural operating frequency of the crystal.

When the frequency of the oscillation applied to the circuit is nearly coincident with the frequency of the crystal as modified by the connected reactances, electro-mechanical oscillations in the crystal 46 will build up and large amplitude oscillations can be obtained without excessive application of voltage and loss in the crystal itself. It is thus evident that as condensers 36 and 40, Figure 3, or condensers 48 and 50, Figure 4, are varied and resonance curves such as Figures 5 and 6 taken for the crystal as the applied frequency is altered, the presence of parasitic modes of oscillation may be detected and the degree of coupling thereof to the crystal evaluated. In this manner, the existence of such parasitic modes of operation having natural frequencies at room temperature close to the natural frequency of crystal operation is determined and if no such modes are found the conclusion can be drawn that these two frequencies will not coincide or approximately coincide at all normal temperatures of operation.

It is the purpose of capacitors 42 and 44, Figure 3, to provide a low impedance current path at each end of the crystal network, thus causing the current flow through the complete unit to vary only with the impedance of the crystal network. Hence capacitor 42 provides a path for current flow across the voltage source and reduces to a small value the voltage variations incident to changes in current through the crystal network. Similarly, capacitor 44 provides a low impedance termination for the crystal network to the end that impedance variations in the circuits connected thereacross do not influence the current flow in the crystal. Resistances 43 and 45 provide similar performance in the circuit of Figure 4.

The above described method of testing crystals requires that a series of measurements be made throughout a range of operating frequency and with the crystal adjusted naturally to oscillate at various frequencies. This is a time consuming process that seriously retards the mass production of crystals. It is the function of the apparatus described hereafter automatically to provide this information in a manner suitable for mass production of crystals and in a manner enabling an unskilled operator to determine quickly whether or not a given crystal has undesired activity dips. A block diagram illustrative of the general arrangement of the apparatus is shown in Figure 7. In this diagram a cathode ray device is shown generally at 52, this device having horizonal ray deflecting plates 54 and vertical ray deflecting plates 56. Voltage is applied to horizonal ray deflecting plates from sweep generator 58 which may, for example, produce a saw toothed voltage wave such as that shown at 60. This voltage is likewise applied to oscillator 62 to vary the frequency thereof. The resultant oscillations are applied to amplifier 64 and crystal 66, the latter unit including both the piezo-electric crystal or other electro-vibratory body and the variable reactances to tune it over a predetermined range. The resultant oscillations of the crystal 66 are amplified in amplifier 68 and detected by detector 70, the latter unit producing a unidirectional voltage having amplitude varying in accordance with the amplitude of oscillation of crystal 66. This voltage is amplified in amplifier 72 and applied to vertical ray deflecting plates 56.

It will be obvious from the above description that as the cathode ray beam is deflected in the horizontal direction across viewing screen 74 by the voltage 60 it is deflected in the vertical direction thereacross in accordance with the voltage of amplifier 72 and hence the magnitude of oscillation of crystal 66. Consequently, an image is traced on the viewing screen corresponding to the resonance curve of the crystal over the frequency range corresponding to the operation of sweep generator 58 and oscillator 62, this curve having the shape shown at 76 under normal high "Q" operation as the oscillator 62 is passed through the crystal resonant frequency.

In the apparatus of Figure 7, the frequency excursions of oscillator 62 about the natural resonant frequency of the crystal need only be in an amount sufficient to cover the possible frequency changes of parasitic modes of oscillation over the anticipated variations in operating temperature. In addition, the frequency of sweep generator 58 is preferably sufficient only to present an image on viewing screen 74 without annoying flicker. Within this limitation it is desirable to make this frequency as low as possible inasmuch as the crystal requires a period of time to build up to steady state oscillations at each frequency and too-rapid variations in the applied frequency will prevent achieving an image presentation representative of the steady-state performance.

A detailed circuit diagram of one embodiment of the apparatus of Figure 7 is shown in Figure 8. In this figure the dashed lines indicate the various units shown in block form in Figure 7. As shown in the figure, the oscillator 62 may, for example, comprise a Hartley type oscillator including electron tube 78 and a tank circuit including variable capacitors 80 and 81 and inductance 82. Capacitor 81 establishes the mean frequency about which rotation of capacitor 80 varies the frequency. Cathode-anode space path voltage for tube 78 is derived from unidirectional voltage source 84 through radio frequency choke coil 86 whereas cathode-control electrode bias voltage is derived from the grid leak-condenser combination comprising resistance 88 and capacitor 90. Capacitor 85, together with choke 86, prevents radio frequency voltage from appearing across source 84. Condenser 92 prevents inductor 82 from short circuiting the unidirectional voltage source 84. By reason of the connection of the control electrode of tube 78 to one end of inductance 82, together with the connection of the cathode to an intermediate point and the anode to the opposite end, there is positive feedback between the anode voltage and the control electrode voltage, thereby producing oscillations in inductance 82 having frequency determined by the natural resonant frequency of the circuit comprising inductance 82 and capacitor 80.

The oscillations in inductance 82 are coupled through coil 94 to the control electrode of electron tube 96. Similarly, oscillations in the anode circuit of tube 96 are coupled to the control electrode of electron tube 98 through capacitor 100, and the resultant oscillations in the anode circuit of device 98 are applied to the crystal unit shown generally at 66. Capacitor 102 tunes coil 94 for best response over the frequency range of oscillator 62, the construction of inductance 94 and capacitor 102 being such that a relatively broadly tuned circuit is provided. Cathode-anode space path potential for electron tubes 96 and 98 is derived from unidirectional voltage source 104 and resistances 105 which is connected to the anodes of these devices through resistances 106 and the screen grid electrodes through resistances 108. Resistances 105, together with capacitors 110, prevent alternating voltages appearing across source 104 from appearing at the anode and screen electrodes of these tubes. By-pass condensers 110 provide a low impedance path for radio frequency voltages between the terminals of resistances 108 and ground. Cathode-control electrode bias voltage for electron discharge devices 96 and 98 is derived from the cathode resistances 112 and capacitors 114. Resistance 116 provides a degree of negative feedback in the amplifier stage comprising electron tube 98, thereby improving the stability of that unit. Resistance 101 acts as a grid leak for tube 98.

The crystal unit 66 corresponds to the circuit shown in Figure 3 and the various components are correspondingly indicated. As described above with reference to Figure 3, variations in the capacitances 36 and 40 alter the natural frequency of oscillation of crystal 46, thereby permitting control of that frequency and enabling oscillations from oscillator 62 to build up large amplitude oscillations of crystal 46 even though those oscillations do not correspond exactly with the natural resonant frequency of crystal 46 in the absence of the reactive elements connected thereacross. Thus as the frequency of oscillator 62 is altered the curve traced on the viewing screen is peaked about the natural frequency of crystal 46 as modified by reactive elements 34, 36, 38, and 40.

Amplifier 68 is of conventional construction and includes electron tube 118 having its control electrode connected to crystal unit 66. The cathode of electron tube 118 is connected to ground through the cathode resistance 120 and by-pass capacitor 122, thus to provide cathode-control electrode bias voltage. Resistance 131 acts as a grid leak for tube 118. The cathode-anode space path potential for tube 118 is derived from unidirectional voltage source 124 through resistances 126 and 128 whereas the cathode-screen electrode space path voltage is dervide from source 124 through resistances 126 and 130. By-pass condenser 132 prevents the appearance of radio frequency voltages between the common connection of resistances 128 and 130 and ground whereas capacitor 123 prevents appearance of radio frequency voltage across the screen electrode of device 118.

Detector 70 is of conventional construction and includes diode electron tube 134 having its anodes connected to the anode of device 118 through capacitor 136 and its cathodes connected to ground through the capacitor 138 shunted by resistance 140. Resistance 137 provides a discharge path for capacitor 136. As successive oscillations are applied to diode 134 from amplifier 68, capacitor 138 is successively charged in a single direction due to the rectifying action of diode 134. This builds up voltage across capacitor 138 until the discharge thereof in successive cycles due to resistance 140 is equal to the charge thereof due to the charging action through diode 134. Hence, the voltage across condenser 138 is determined by the amplitude of oscillations from amplifier 68 and hence the amplitude of oscillations from crystal unit 66.

It is the function of unit 72 to amplify the voltage across condenser 138 to a value adequate for the vertical deflecting plates 56 of cathode ray tube 52. To this end, electron tube 142 is connected to condenser 138 through capacitor 144 and resistance 146. Cathode-anode space path voltage for device 142 is derived from unidirectional voltage source 124 through resistance 148 and radio frequency choke coil 150, the purpose of the latter being to prevent the appearance of radio frequency voltages across the vertical ray deflecting plates of device 52, this action being supplemented by by-pass capacitor 152. Cathode-control electrode bias voltage for device 142 is derived from cathode resistance 154 and by-pass capacitor 156. The vertical ray deflecting plates 56 of device 52 are connected to the anodes of device 142 through capacitor 158.

The capacitors 144 and 158 are intended to pass the alternating voltage appearing across capacitor 138 without substantially reducing the value thereof. To this end, relatively large capacitances are chosen, the sizes being determined by the rate of frequency sweep of oscillator 62.

It is the purpose of unit 58 to provide a sweep voltage for application to the horizontal ray deflecting plates of cathode ray device 52. To this end, unidirectional voltage source 160 is connected to potentiometer 162 having its movable terminal connected to one of ray deflecting plates 54 of cathode ray device 52. Automatic variation in the voltage appearing across the moving terminal of potentiometer 162 is achieved by mechanically moving that terminal by motor 162 which is likewise connected to variable capacitor 80 of oscillator 62. Thus as motor 162 rotates, the voltage applied to the horizontal ray deflecting plates 54 of device 52 is varied simultaneously with the frequency of oscillator 62 and an image is traced on the viewing screen of device 52, the horizontal position of the image being determined by the frequency of operation of oscillator 62 and the vertical position being determined by the amplitude of oscillations in crystal 66. Hence, the crystal resonance curve is traced on the viewing screen in the manner described with reference to Figure 7.

An alternate embodiment of the saw tooth generator and oscillator portion of the structure of Figure 8 is shown in Figure 9. In Figure 9, the saw tooth voltage wave is generated by the operation of gaseous discharge device 164 which recurrently discharges the selected condenser 166. This condenser is normally charged through unidirectional voltage source 168 and resistance 170 and when the voltage thereacross exceeds a predetermined value determined by the control electrode-cathode bias voltage of device 164 the latter device conducts, thereby suddenly discharging the selected condenser 166. Control electrode-cathode bias voltage for device 164 is derived from unidirectional voltage source 172 and potentiometer 174 in conjunction with series resistance 176. Thus a saw tooth voltage is applied to the control electrode of electron tube 178. Cathode-anode voltage for this tube is derived from unidirectional voltage source 180 and output voltage is taken across cathode potentiometer 182 in the conventional cathode follower circuit. The voltage at the moving terminal of potentiometer 182 is applied through potentiometer 184 to the control electrode of electron tube 186, unidirectional voltage source 188 providing a component of bias voltage at the control electrode of that tube. This causes the cathode-anode space current in tube 186 to vary in accordance with the voltage wave across the selected condenser 166. This current flow produces a voltage drop across resistance 190 which is applied through condenser 192 to horizontal ray deflecting plates 54 of cathode ray device 52. Unidirectional voltage source 194 provides cathode-anode space path voltage for tube 186 through resistance 190 and cathode-screen electrode space path voltage through resistance 196.

Electron tube 78 is arranged in the same Hartley oscillator circuit as is shown in Figure 8 except that the intermediate point of inductance 82 is grounded rather than the end thereof. It is the purpose of electron tube 198 and the associated circuit to cause the frequency of oscillations from this oscillator to vary in accord with the voltages across the selected condenser 166. To this end, the cathode-anode space path of tube 198 is connected through capacitors 200 and 202 across the inductance 82, condenser 202 being shunted by resistance 204 to provide cathode-control electrode space path bias voltage for that tube. The screen electrode of tube 198 is connected through resistance 206 to the positive terminal of unidirectional voltage source 84 whereas the anode of device 198 is connected to the same terminal through radio frequency choke coil 208. Condenser 85 prevents radio frequency voltages from appearing across source 84. Radio frequency voltage substantially 90 degrees out of phase with the voltage across inductance 82 is applied to device 198 through the RC circuit including resistance 210 and condenser 212, the impedance of the condenser being relatively large as compared with the resistance to provide a substantially 90 degree phase displacement. Thus, the radio frequency component of space current flow through device 198 is 90 degrees out of phase with the voltage across inductance 82 and the former device acts as a reactive element so far as inductance 82 is concerned. Hence, variations in the magnitude of this current relative to the voltage across inductance 82 alter the resonant frequency of inductance 82 in conjunction with device 198, thereby altering the frequency of oscillations from tube 78. Control of this frequency is obtained by varying the unidirectional component of control electrode voltage for tube 198, this variation being made in the saw tooth wave shape corresponding to the deflection of the cathode ray beams by reason of the connection from the control electrode of device 178 through choke coil 214 to the control electrode of device 198.

From the above description it will be obvious that the saw tooth voltage generated by the action of gaseous discharge device 164 coacting with condenser 166 not only causes horizontal motion of the cathode ray beam of device 52 by reason of the connection of a horizontal deflecting plate 54 to electron discharge device 186 but also directly varies the frequency of oscillation from oscillator 62. Hence, these two quantities are varied simultaneously and the desired image displayed on the viewing screen.

It will be obvious to those skilled in the art that the apparatus of Figures 7, 8, and 9 provides a high degree of convenience in testing crystals in accordance with the principles of my invention. Thus, it is only necessary to vary the values of condensers 36 and 40, Figure 8, to vary the natural oscillating frequency of crystal unit 66. The operator of the equipment may do this by hand while observing the viewing screen 74. Obviously, if the resonance curve displayed on the viewing screen 74 is a sharply peaked curve, such as that shown in Figure 5, there are no parasitic modes of oscillation of the crystal likely to interfere with operation thereof at the temperatures incident to normal operation. However, if a change of the resonance curve to a form similar to that shown in Figure 6 is observed, difficulty due to parasitic modes of oscillation may be anticipated and the crystal either discarded or ground in a manner correcting the difficulty. By the use of this apparatus it is thereby possible for an unskilled operator visually to observe the characteristics of a crystal tested in a quick and convenient manner and without delaying other production operations.

In a modification of the apparatus of my invention, the detector 70, Figure 7, may be omitted. In this case alternating voltage is applied to the vertical ray deflecting plates 56 of cathode ray device 52 and the ray beam caused to execute motion above and below the axis of the screen in accord with the magnitude of this voltage. The resultant image on the viewing screen then indicates the nature of the crystal performance and enables an evaluation of the crystal characteristics. This modification has the advantage of avoiding the non-linearities necessarily introduced into the system by the detector stage.

It will be observed that the apparatus constructed in accordance with my invention is responsive to the magnitude of current flow through the crystal network as the voltage applied thereto is maintained constant. Thus the admittance of the crystal network, as distinguished from the impedance thereof, is displayed as a curve on the cathode ray viewing screen. Use of this curve constitutes an important feature of my invention for the presence of parasitic modes of oscillation is then indicated by a readily observable flat or double humped curve whereas such modes are reflected only as minor variations in the impedance curve.

While I have shown a particular embodiment of my invention, it will of course be understood that I do not wish to be limited thereto since many modifications both in the circuit arrangement and in the structures disclosed may be made without departing from the spirit and scope thereof. I, of course, contemplate by the appended claims to cover any such modifications as fall within the true spirit and scope of my invention.

What I claim as new and desire to secure by Letters Patent of the United States is:

1. A device for predicting piezo-electric crystal performance at temperatures remote from the temperature of test comprising a pair of terminals for receiving a piezo-electric crystal therebetween, a source of electric oscillations connected to said terminals, a variable reactance including inductive reactance connected in parallel across said terminals, and means to indicate the amplitude of oscillations of said crystal whereby when a crystal is positioned between said terminals and said reactance is varied, the effective frequency of the circuit including the crystal and the reactance is changed.

2. A device for predicting piezo-electric crystal performance at temperatures remote from the temperature of test comprising a pair of terminals for receiving a piezo-electric crystal therebetween, a source of electric oscillations connected to said terminals, a variable reactance including inductive reactance and capacity reactance connected in series with said terminals, and means to indicate the amplitude of oscillations of said crystal whereby when a crystal is positioned between said terminals and said reactance is varied, the effective frequency of the circuit including the crystal and the reactance is changed.

3. A device for predicting piezo-electric crystal performance at temperatures remote from the temperature of test comprising a pair of terminals for receiving a piezo-electric crystal therebetween, a source of electric oscillations connected to said terminals, a variable reactance including inductive reactance and capacity reactance connected in parallel across said terminals and additional inductive reactance and capacity reactance connected in series with said terminals, and means to indicate the amplitude of oscillations of said crystal whereby when a crystal is positioned between said terminals and said reactance is varied, the effective frequency of the circuit including the crystal and the reactance is changed.

4. A device for predicting crystal performance at substantially constant temperature to locate secondary modes in the vicinity of the main mode which might interfere with the main mode over the working range of the crystal comprising a pair of terminals for receiving a piezo-electric crystal, a source of electric oscillations connected to said terminals, means for substantially neutralizing the shunt capacity of a crystal when such a crystal is disposed between said terminals, a variable reactance connected in series with said terminals, and means for observing the effect of variations on the frequency characteristics of the crystal when said reactance is changed.

5. A device for predicting crystal performance at temperatures remote from the temperature of test including a source of oscillations, a pair of terminals for receiving a crystal connected to said source, means to indicate the amplitude of oscillations of said crystal, variable reactance means including both inductive reactance and capacity reactance connected across said terminals, whereby when a crystal is positioned between said terminals and said reactance is adjusted, the effective frequency of the circuit including the crystal and the reactance elements is changed.

HANS EKSTEIN.

REFERENCES CITED

The following references are of record in the file of this patent:

UNITED STATES PATENTS

| Number | Name | Date |
|---|---|---|
| 2,162,827 | Schrader | June 20, 1939 |
| 2,380,791 | Rosencrans | July 31, 1945 |
| 2,400,895 | Wachtman | May 28, 1946 |
| 2,440,886 | Bach | May 4, 1948 |

OTHER REFERENCES

Hund: High-Frequency Measurements, McGraw-Hill, 1933, pages 430–431.